Aug. 27, 1963    G. B. EVELYN ETAL    3,101,918
EMERGENCY RAM AIR CABIN PRESSURIZATION SYSTEM
Filed May 31, 1961    3 Sheets-Sheet 1
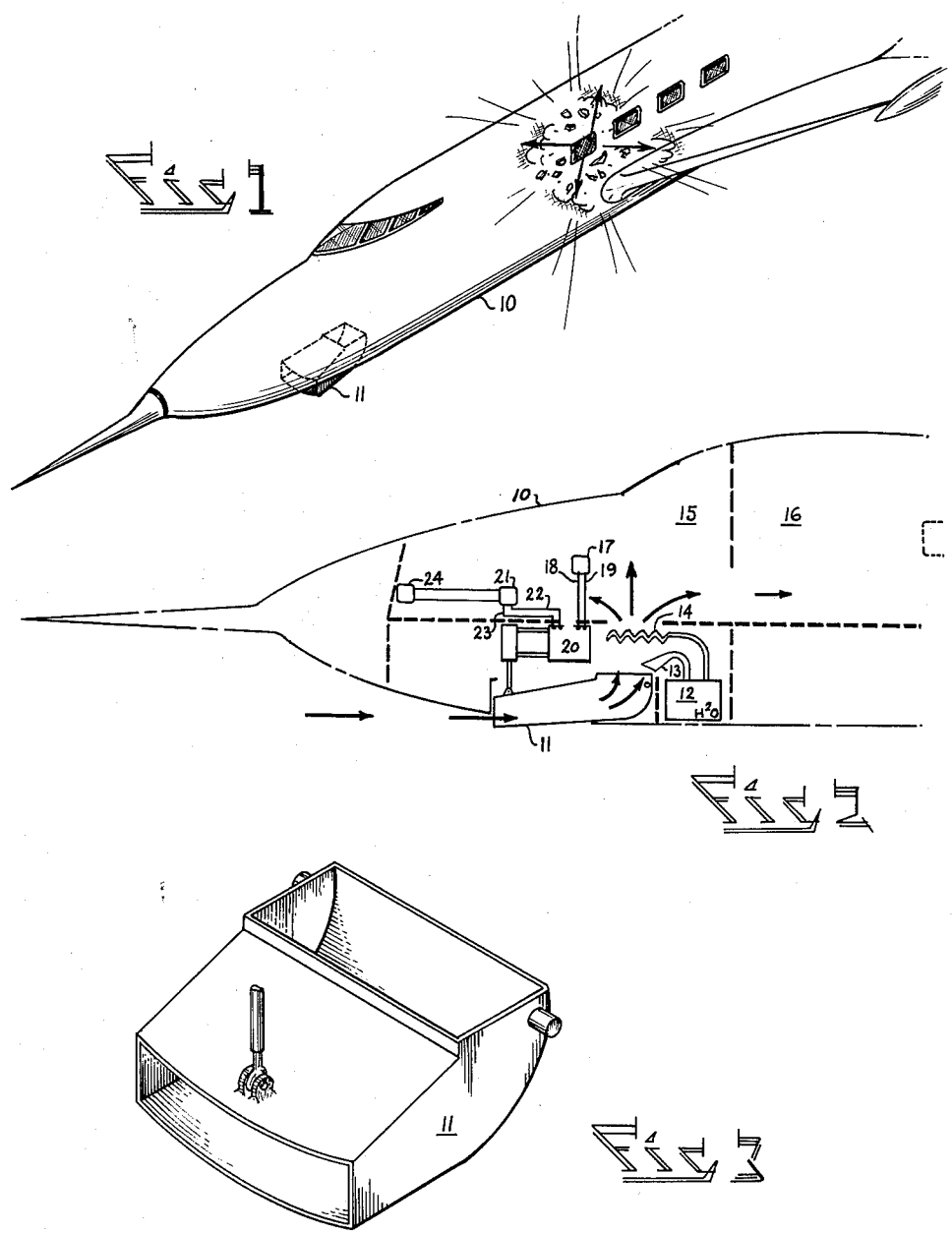
INVENTORS
GEORGE B. EVELYN
BY GEORGE C. NEWELL
MARVIN D. PETERSON
Roy Mattern Jr.
ATTORNEY Aug. 27, 1963 G. B. EVELYN ETAL 3,101,918
EMERGENCY RAM AIR CABIN PRESSURIZATION SYSTEM
Filed May 31, 1961 3 Sheets-Sheet 2

INVENTORS
GEORGE B. EVELYN
GEORGE C. NEWELL
BY MARVIN D. PETERSON

ATTORNEY

United States Patent Office 3,101,918
Patented Aug. 27, 1963

3,101,918
EMERGENCY RAM AIR CABIN PRESSURIZATION SYSTEM
George B. Evelyn and George C. Newell, Seattle, and Marvin D. Peterson, Bellevue, Wash., assignors to The Boeing Company, Seattle, Wash., a corporation of Delaware
Filed May 31, 1961, Ser. No. 113,705
6 Claims. (Cl. 244—76)

This invention relates to aircraft air conditioning systems and more particularly to an emergency ram air cabin pressurization system and equipment therefor.

The purpose of the invention is to provide an emergency system capable of providing sufficient air for supporting an active crew and insuring the survival of all persons aboard, following a failure in the cabin integrity which would otherwise result in excessive decompression. Such a happening is often referred to as an explosive decompression, and may occur upon the loss of a window, hatch, door or other structure.

The emergency ram air cabin pressurization system comprises equipment which quickly functions to collect, cool, control and direct ram air into the aircraft interior in quantities sufficient to overcome the explosive decompression losses, meeting or exceeding the minimum air requirements of cabin conditions corresponding to a selected elevation in the range of 20,000 to 42,000 feet above sea level.

An embodiment of the invention is shown in the drawings wherein:

FIGURE 1 is a partial perspective view of an aircraft equipped with an emergency ram air pressurization system showing the ram air intake opening as decompression occurs upon loss of a window.

FIGURE 2 is a partial interior view of an aircraft showing the general arrangement of the components of an emergency ram air pressurization system.

FIGURE 3 is a perspective view of a ram air inlet for the pressurization system.

Figure 4:
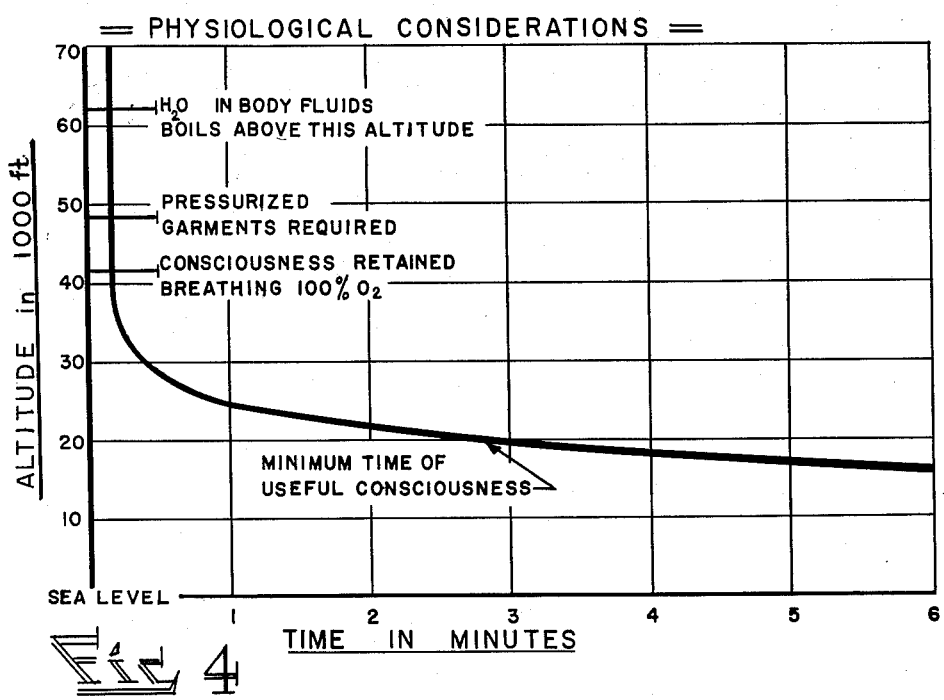
FIGURE 4 is a graph indicating physiological considerations pertaining to high altitude travel.

As indicated in FIGURE 4, persons traveling in vehicles at high altitudes can survive and operate a vehicle up to altitudes of 42,000 feet above sea level without special controls of their cabin environment, provided they can breathe 100% oxygen. If oxygen is not available the limiting altitude of survival drops to approximately 20,000 feet above sea level, the exact tolerable limiting altitude being dependent on the physical condition of the individuals.

Therefore, when airplanes 10 as shown in FIGURE 1 are designed for travel at very high altitudes serious consideration must be given: first, to designing the structure and internal air conditioning systems to provide for the safety and comfort of the crew and passengers, and secondly, to providing emergency means to overcome failures causing serious decompression. If the original design contemplates possible failures and steps are taken to minimize them, then the performance requirements of the emergency means can be minimized. For example, if the original design calls for small area windows, the loss of a window of restricted area can be overcome by an emergency ram air system of lower capacity.

This invention contemplates that good basic aircraft design criteria will be followed initially and the emergency system requirements therefore will be minimized. Yet the emergency system will be adequate to insure survival providing prompt action is taken by the crew or commenced by automatic emergency controls which may operate in conjunction with the automatic flight controls.

The action taken either by the crew or by the automatic emergency controls centers on the maneuvering the aircraft rapidly down to survival altitudes, i.e., approximately 42,000 feet above sea level with passenger oxygen and approximately 20,000 feet about sea level without oxygen. The reaching of these altitudes quickly not only reduces the design parameters of the emergency pressurization system but makes such a system both practical and reliable.

One of the many factors requiring a quick descent is the need for cooling captured ram air taken into the aircraft at speeds in excess of about Mach 1.4, for its temperature is beyond human tolerance. Cooling of this ram air is best accomplished by carrying an emergency cooling medium such as water. However, economic weight and space considerations limit the quantity of emergency coolant to be carried during normal flight operations. So prolonged operation of practical emergency ram air pressurization equipment is not possible for this reason alone.

This invention, therefore, provides a reliable emergency cabin pressurization system of reasonable capacity to condition ram air in sufficient quantity to offset explosive decompression losses until the aircraft is rapidly maneuvered to a lower safe elevation providing a survival cabin altitude during the descent.

In the embodiment illustrated in FIGURES 1, 2, and 3, as cabin air decompression occurs, replenishing air is captured by a ram air scoop 11 to maintain cabin air pressure at a sufficiently high level. The temperature of the required captured air is reduced by the functioning of the cooler 12 which is activated by the ram air stream pressure effect on the pressure horn 13. In response to the build up of ram air pressure in the horn 13, the cooler 12 ejects sufficient water through atomizing spray nozzles 14 to reduce the ram air temperature to approximately 100° F. before the conditioned air reaches compartments 15 and 16.

The other equipment shown in these figures centers on triggering or initiating the operation of the entire emergency pressurization system. Such other equipment is functionally coupled with the ram air scoop 11. By controlling the scoop alone, the entire emergency pressurization system is regulated. The crew moves the air scoop 11 into the ambient air to the opening required by operating a switch 17 that controls electrical power distributed through wires 18 and 19 to an electro-hydraulic positioner 20. Or the ram air scoop 11 is lowered as the positioner 20 is automatically controlled by a sensing device 21 that governs a power supply distributed to it through wires 22, 23. In turn, the sensor 21 is triggered when certain limitations are exceeded in the variations in one or more of the following: absolute cabin pressure, cabin pressure differential, rate of change of cabin pressure and combinations thereof.

In the embodiment selected only one retractable scoop is illustrated and FIGURE 3 shows its relative proportions. However, whether one principal ram air intake or several are used, the design parameters are essentially alike. There must be sufficient intake area to meet the air volume requirements; good aerodynamic design with respect to both the scoop interior and exterior; and a satisfactory location for intake flow continuity, structural integrity, and actuation force accessibility.

Rather than permanent or retractable scoops, flush openings (not shown) could be relied upon and covered with retractable or frangible diaphragm covers. Also jet engine bleed air could be relied upon in greater quantities to supplement the ram air upon decompression. Controls (not shown) associated with the sensor 21 could open engine bleed air inlets not required to be open under normal flight conditions.

As indicated previously and as shown in the illustrated embodiment, the emergency ram air system in operation matches the decompression load. This is accomplished as the sensor 21 selectively positions the scoop 11 in relation to cabin pressure. The scoop opening in turn establishes the magnitude of the pressure in the horn 13. The horn 13 pressure regulates the water pumped to the sprayers 14.

By matching the decompression load in this way, the cabin pressure is kept within safe limits and the coolant is utilized effectively over a longer period of time during an emergency descent.

Figure 5:
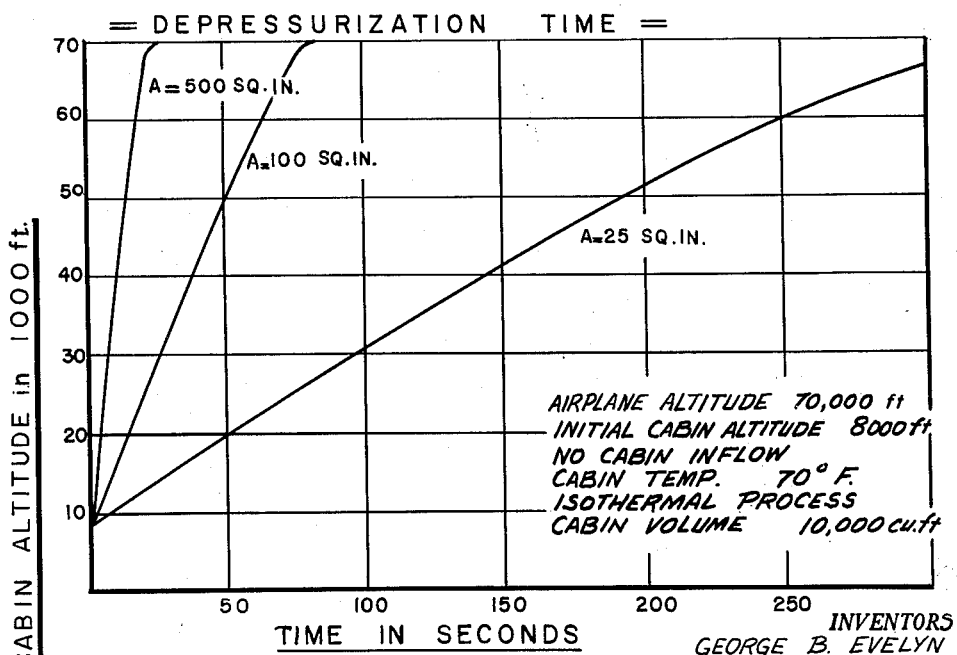
FIGURE 5 is a graph indicating the depressurization rates following decompression failures of three different magnitudes.
Figure 6:
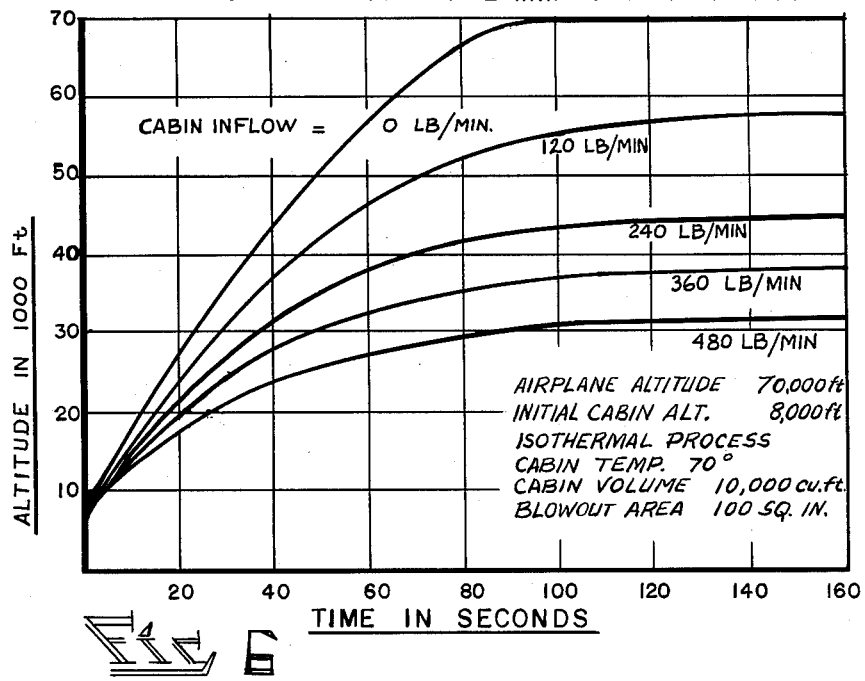
FIGURE 6 is a graph indicating the depressurization times following a decompression failure of one magnitude but with four different rates of emergency cabin inflow ram air.

FIGURES 5 and 6 illustrate the critical minimum times that are involved when decompression occurs. FIGURE 5, assuming the conditions noted, show how soon critical cabin altitudes are reached and surpassed when no cabin inflow is available through the operation of an emergency system. FIGURE 6, assuming the conditions noted, shows that even with cabin inflow provided by an emergency system the reacquiring or the continuation of survival cabin conditions is extremely difficult. Therefore, as indicated previously, any design of an emergency system should consider the absolute requirement of a quick descent to safe altitudes.

If all or part of the crew can be isolated at all times during flight or at least upon decompression by the creation of a capsule configuration, descent maneuvers will be undertaken with reasonable certainty. If this is not possible or the crew compartments themselves suffer the damage causing decompression, then a completely automatic emergency system is a necessity. Such a complete system requires that the automatic flight controls 24 supplemented by the automatic emergency ram air controls combined to maneuver the aircraft to safe altitudes while the emergency system is undergoing its effective but time limited cycle. The sensor 21 is utilized to trigger both sets of automatic controls.

Although essentially only one embodiment has been illustrated there are other components and functions thereof that could be relied upon to equip an aircraft with an effective emergency ram air cabin pressurization system. For example, most quick descent maneuver procedures call for lowering of the landing gear and other components to increase the drag. The emergency system could be coordinated with such procedures under controlled conditions so the landing gear actuators could open up ram air intakes.

However, in any embodiment of the ram air cabin pressurization system, the performance must meet the fundamental specifications of adequate supplies of ram air taken in through intakes that insure pressure recovery, sufficient quantities of coolant used effectively, and reliable controls to trigger and regulate the operation of powerful intake actuators when the emergency system is needed.

Figure 7:
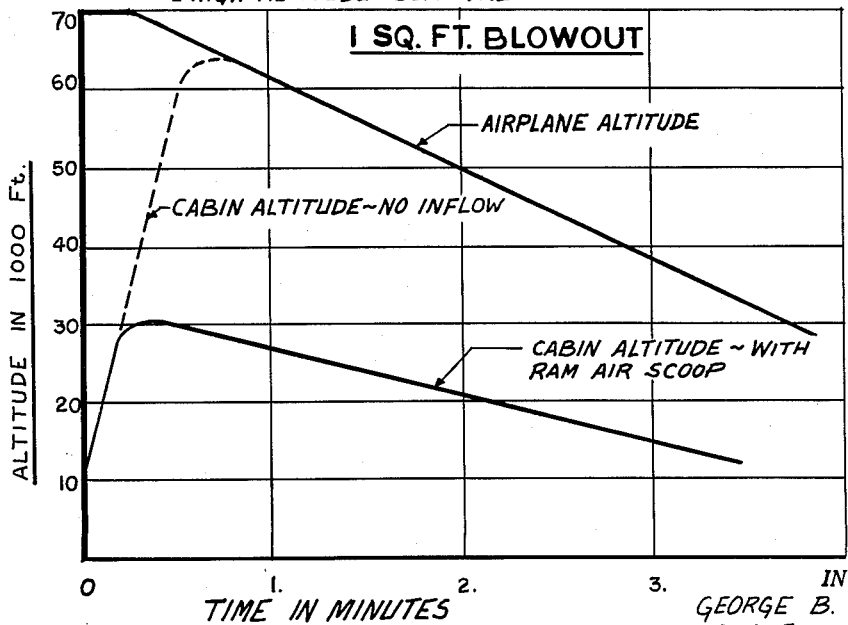
FIGURE 7 is a graph showing the necessity of the effective performance of an emergency ram air pressurization system to insure survival.

The performance of an emergency ram air pressurization system based on these fundamental specifications is illustrated in FIGURE 7 in comparison to what would occur if no system were available. An aircraft flying at 70,000 feet above sea level having a one square foot blow out area could not possibly descend rapidly enough. The maintenance of a survival cabin altitude during descent can only occur with this effective emergency ram air pressurization system.

We claim as our invention:

1. An emergency ram air pressurization system for pressurized aircraft operating at high speeds and high altitude comprising a variable area air scoop for ram air, actuator means for said air scoop, means responsive to internal aircraft pressure for controlling said actuator means, variable capacity cooling means for said ram air, and means responsive to ram air pressure for controlling said cooling means, whereby life sustaining air pressure may be maintained in an aircraft undergoing excessive decompression.

2. The emergency ram air pressurization system defined in claim 1 wherein said pressure responsive control means additionally actuates automatic flight control means for quickly directing the aircraft to a lower altitude.

3. The emergency ram air pressurization system defined in claim 2 wherein said cooling means is of the fluid injection type and said pressure responsive cooler control means varies the amount of fluid injected into the ram air.

4. In a pressurized aircraft operating at high speeds and at altitudes of over 40,000 feet an emergency ram air pressurization system for supplying sufficient life sustaining air pressure to the cabin of said aircraft following excessive decompression due to failure of aircraft structure comprising a variable area air scoop for supplying ram air to said cabin, actuator means for said air scoop, control means for said actuator means, said control means being responsive to aircraft cabin pressure, means for cooling said ram air before said air enters said cabin, and control means for said cooling means, said last mentioned control means being responsive to the pressure of said ram air.

5. The emergency cabin pressurization system defined in claim 4 wherein said pressure responsive control means for said air scoop actuator means additionally actuates automatic flight control means for quickly directing the aircraft to an altitude under 40,000 feet.

6. The emergency cabin pressurization system defined in claim 4 wherein said cooling means is of the fluid injection type and said ram air pressure responsive cooler control means varies the amount of fluid injected into the ram air.

References Cited in the file of this patent

UNITED STATES PATENTS

| | | |
|---|---|---|
| 1,726,183 | Knapp | Aug. 27, 1929 |
| 2,181,199 | Otterson | Nov. 28, 1939 |
| 2,284,984 | Nixon et al. | June 2, 1942 |
| 2,424,491 | Morris | July 22, 1947 |
| 2,445,335 | Philbrick et al. | July 20, 1948 |
| 2,575,541 | Williamson | Nov. 20, 1951 |
| 3,053,162 | Andresen | Sept. 11, 1962 |

FOREIGN PATENTS

| | | |
|---|---|---|
| 748,030 | Germany | Oct. 25, 1944 |